US010296859B1

(12) United States Patent
Johnston

(10) Patent No.: US 10,296,859 B1
(45) Date of Patent: *May 21, 2019

(54) WORKFLOW DISCOVERY THROUGH USER ACTION MONITORING

(71) Applicant: Amazon Technologies, Inc., Reno, NV (US)

(72) Inventor: Simon K. Johnston, Snohomish, WA (US)

(73) Assignee: Amazon Technologies, Inc., Seattle, WA (US)

(*) Notice: Subject to any disclaimer, the term of this patent is extended or adjusted under 35 U.S.C. 154(b) by 1461 days.

This patent is subject to a terminal disclaimer.

(21) Appl. No.: 14/164,489

(22) Filed: Jan. 27, 2014

Related U.S. Application Data

(63) Continuation of application No. 13/271,840, filed on Oct. 12, 2011, now Pat. No. 8,639,555.

(51) Int. Cl.
G06Q 10/06 (2012.01)
G06Q 10/10 (2012.01)

(52) U.S. Cl.
CPC ......... *G06Q 10/0633* (2013.01); *G06Q 10/06* (2013.01); *G06Q 10/0631* (2013.01)

(58) Field of Classification Search
CPC ............................................. G06Q 10/0633
USPC ...................................................... 705/7.27
See application file for complete search history.

(56) References Cited

U.S. PATENT DOCUMENTS

| 6,278,977 | B1* | 8/2001 | Agrawal | G06Q 10/0633 705/7.27 |
| 8,073,731 | B1* | 12/2011 | Rajasenan | G06Q 10/0637 705/7.38 |
| 2002/0174093 | A1* | 11/2002 | Casati | G06Q 30/02 |
| 2006/0167704 | A1* | 7/2006 | Nicholls | G06Q 10/06393 705/7.39 |
| 2009/0281865 | A1* | 11/2009 | Stoitsev | G06Q 10/06 705/7.22 |
| 2010/0070449 | A1* | 3/2010 | Arnold | G06N 5/02 706/48 |
| 2012/0066166 | A1* | 3/2012 | Curbera | G06N 7/005 706/52 |

OTHER PUBLICATIONS

W.M.P. van der Aalst "Flexible Workflow Management Systems: An Approach Based on Generic Process Models". in T. Bench-Capon, G. Soda, and A M. Tjoa (Eds.): DEXA'99, LNCS 1677, pp. 186-195, 1999.Springer-Verlag Berlin Heidelberg 1999.*

* cited by examiner

*Primary Examiner* — Mark A Fleischer
(74) *Attorney, Agent, or Firm* — Thomas Horstemeyer, LLP

(57) ABSTRACT

Disclosed are various embodiments for discovering workflows through analysis of user actions. Workflow descriptions are entered by multiple users over a period of time as the users perform user actions. Each workflow description includes a sequence of user action descriptions. The workflow descriptions are modeled as directed graphs, and one or more candidate workflows are determined by identifying a set of isomorphic directed graphs from the directed graphs.

20 Claims, 8 Drawing Sheets

WORKFLOW DISCOVERY THROUGH USER ACTION MONITORING

CROSS-REFERENCE TO RELATED APPLICATIONS

This application is a continuation of, and claims priority to, co-pending U.S. patent application entitled "WORKFLOW DISCOVERY THROUGH USER ACTION MONITORING," filed on Oct. 12, 2011, and assigned application Ser. No. 13/271,840, which is incorporated herein by reference in its entirety.

BACKGROUND

A workflow corresponds to a sequence of tasks to achieve a desired result. In workflow management systems, workflows are defined statically, for example, in workflow definition languages such as business process execution language (BPEL), Xlang, extensible markup language (XML) process definition language (XPDL), and others. A workflow may include various business processes and operate on data such as business objects and other data.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to discovery of workflows from the monitoring of user actions. Workflows are typically statically defined in a workflow definition language such as business process execution language (BPEL), Xlang, extensible markup language (XML) process definition language (XPDL), and others. Statically defined workflows are advantageous in that supporting software or hardware systems may be designed to assist in processing particular steps of the static workflow. However, certain classes of workflows are difficult to express statically. For example, one workflow might involve giving users a choice about where the workflow proceeds at a certain point. Additionally, it may be difficult to obtain information about how a workflow should be defined. Users may not be able to articulate how they perform their work, and there may be a high degree of variability relating to how individuals in a group perform their work.

Various embodiments of the present disclosure enable monitoring of user actions in workflows as they are performed by users over a period of time. From these user actions, repeated patterns may be identified by a workflow discovery application. Candidate workflows may be proposed and may be modified by users. In some cases, multiple candidate workflows may be merged to form a conditional workflow. Workflow definitions in a suitable workflow definition language may be generated from the potentially modified candidate workflows. In the following discussion, a general description of the system and its components is provided, followed by a discussion of the operation of the same.

Figure 1:
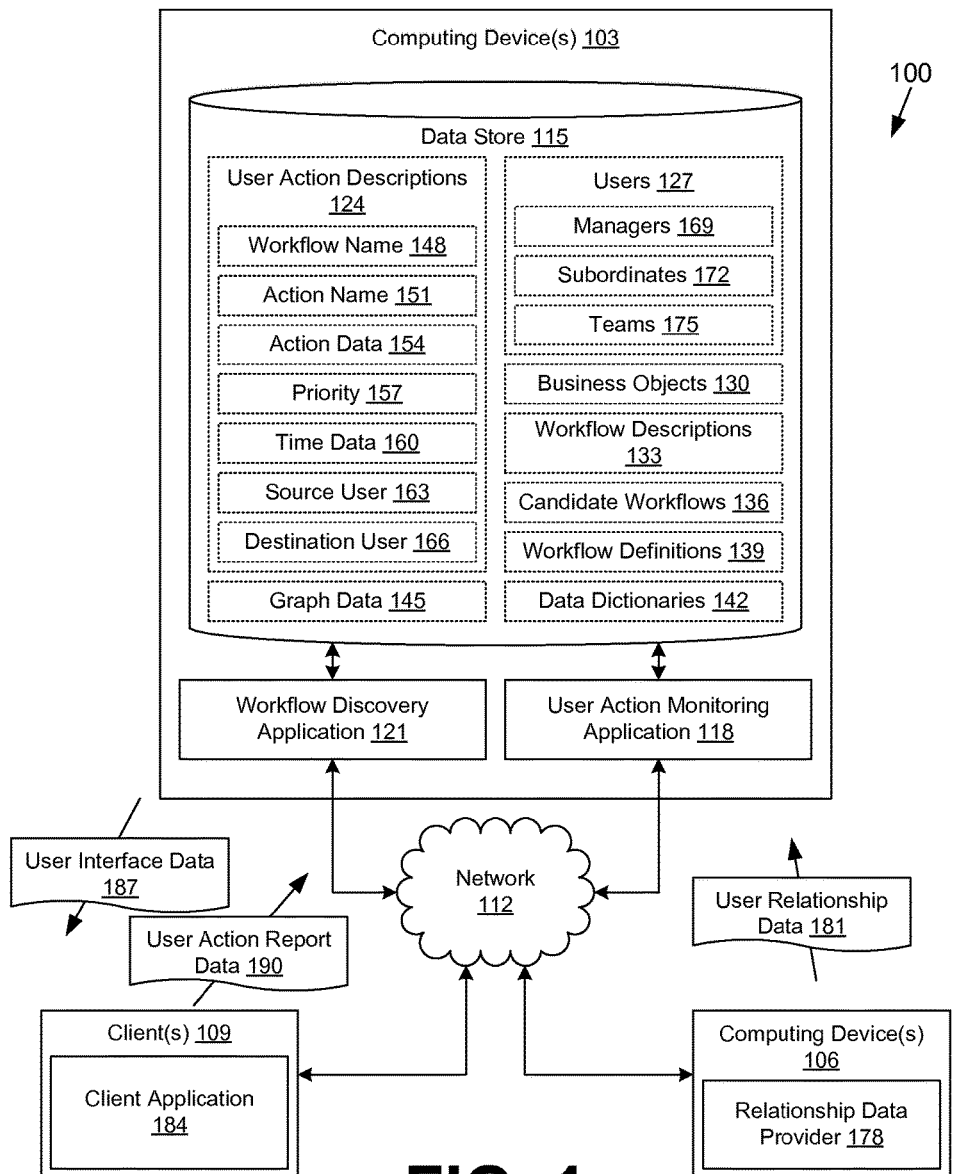
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more computing devices 106 and one or more clients 109 by way of a network 112. The network 112 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 115 that is accessible to the computing device 103. The data store 115 may be representative of a plurality of data stores 115 as can be appreciated. The data stored in the data store 115, for example, is associated with the operation of the various applications and/or functional entities described below.

The components executed on the computing device 103, for example, include a user action monitoring application 118, a workflow discovery application 121, and other applications, services, processes, systems, engines, or functionality not discussed in detail herein. The user action monitoring application 118 is executed to facilitate monitoring of user actions with respect to a workflow. The user action monitoring application 118 observes the users performing actions in connection with their work and then assigning actions to other users along with associated data. In various embodiments, the user action monitoring application 118 may correspond to an ad hoc workflow management system, with task-tracking features, follow-up features for uncompleted tasks, notification features, etc.

The workflow discovery application 121 processes the data obtained by the user action monitoring application 118 to identify repeated patterns among the observed workflows. The workflow discovery application 121 then generates one or more proposed workflows based at least in part on the repeated patterns. The proposed workflows are presented for manual review via a user interface, which also facilitates modification of the proposed workflows. The workflow discovery application 121 may also generate workflow definitions in workflow definition languages for the proposed, and potentially modified, workflows.

The data stored in the data store 115 includes, for example, user action descriptions 124, users 127, business objects 130, workflow descriptions 133, candidate workflows 136, workflow definitions 139, one or more data dictionaries 142, graph data 145, and potentially other data. The user action descriptions 124 describe user actions created by one user 127 and assigned to another user 127. To this end, each user action description 124 may include a workflow name 148, an action name 151, action data 154, a priority 157, time data 160, a source user 163, a destination user 166, and/or other data.

The workflow name 148 corresponds to a name and/or unique identifier for a workflow to which the user action description 124 belongs. For example, the workflow name 148 may correspond to an overall task that is performed by multiple subtasks in the workflow. The action name 151 describes or identifies the specific subtask, or user action, embodied by the particular user action description 124. The action data 154 corresponds to one or more instances of business objects 130, text data, freeform data, files, attachments, etc. that are associated with the particular user action and are employed by the destination user 166 in performing the user action.

The priority 157 field may indicate a particular level of priority or importance that is to be given to the particular user action. The time data 160 may include time-related information pertaining to the user action. Such time data 160 may include, for example, a time at which the user action description 124 was created, a time at which the user action was assigned from the source user 163 to the destination user 166, a time at which the user action was completed by the destination user 166, and/or other data.

The source user 163 corresponds to a user 127 who created the user action description 124 and who assigned a user action identified by the action name 151 to the destination user 166. In some situations, the source user 163 may be creating a workflow identified by the workflow name 148, while in other situations, the source user 163 may be completing another user action of the workflow that was assigned to him or her. The destination user 166 is the user 127 to whom the user action is assigned. In some cases, the destination user 166 may be specified by role or as any one of a group of users 127. When a workflow is completed, there may be no destination user 166 and the user action description 124 may be marked as completed. In some embodiments, a source user 163 may be able to generate multiple user action descriptions 124 from the same workflow so as to create multiple user actions that are respectively assigned to multiple destination users 166.

The users 127 correspond to employees or other workers who perform business-oriented tasks as part of workflows. The users 127 may have specific jobs or responsibilities within a business entity. Each of the users 127 may be associated with one or more managers 169, one or more subordinates 172, one or more teams 175, and/or other business relationships. The business objects 130 are standardized objects of data that may each correspond to business concepts such as, for example, items, products, vendors, customer orders, purchase orders, customers, and so on, depending on the particular business.

The workflow descriptions 133 provide an entry point to a sequence of user action descriptions 124 which correspond to an observed workflow. The workflow descriptions 133 may each be associated with a respective workflow name 148 from the sequence of user action descriptions 124. The candidate workflows 136 correspond to proposed classes of workflows identified by the workflow discovery application 121 from the workflow descriptions 133 and the user action descriptions 124. In various embodiments, the user action descriptions 124, the workflow descriptions 133, the candidate workflows 136, and/or portions thereof may be expressed in XML. The workflow definitions 139 correspond to definitions of workflows for the candidate workflows 136 in workflow definition languages such as BPEL, Xlang, XPDL, and others. The workflow definitions 139 may be suitable for execution by a commercially available workflow management system.

The data dictionaries 142 may correspond to standardized listings of workflow names 148, action names 151, names of teams 175, names of roles of users 127, and so on. The data dictionaries 142 are employed by the user action monitoring application 118 to facilitate creation of user action descriptions 124 and workflow descriptions 133 by users 127. By using a data dictionary 142, the likelihood of duplicate terms being used to name the same task or workflow is reduced. The data dictionaries 142 may be user-modifiable to add names in some embodiments.

The graph data 145 includes various graph-based data models employed by the workflow discovery application 121 to identify candidate workflows 136 from the user action descriptions 124 and workflow descriptions 133. In one embodiment, a workflow description 133 may be modeled as a directed graph as will be described further in connection with FIGS. 2A and 2B.

The computing device 106 may comprise, for example, a server computer or any other system providing computing capability. Alternatively, a plurality of computing devices 106 may be employed that are arranged, for example, in one or more server banks or other arrangements. For example, a plurality of computing devices 106 together may comprise a cloud computing resource, a grid computing resource, and/or any other distributed computing arrangement. Such computing devices 106 may be located in a single installation or may be distributed among many different geographical locations. For purposes of convenience, the computing device 106 is referred to herein in the singular. Even though the computing device 106 is referred to in the singular, it is understood that a plurality of computing devices 106 may be employed in the various arrangements as described above.

Various applications and/or other functionality may be executed in the computing device 106 according to various embodiments. Also, various data is stored in a data store that is accessible to the computing device 106. The components executed on the computing device 106, for example, include a relationship data provider 178 and other applications, services, processes, systems, engines, or functionality not discussed in detail herein. The relationship data provider 178 is executed to provide user relationship data 181 to the workflow discovery application 121 and/or the user action monitoring application 118. The user relationship data 181 may define various relationships among the users 127, such as subordinate-manager relationships, team memberships, different team relationships, same team relationships, roles and responsibilities, and so on. In various embodiments, the relationship data provider 178 may correspond to an Active Directory server, a lightweight directory access protocol (LDAP) server, and/or other types of servers.

The client 109 is representative of a plurality of client devices that may be coupled to the network 112. The client 109 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 109 may include a display comprising, for example, one or more devices such as cathode ray tubes (CRTs), liquid crystal display (LCD) screens, gas plasma-based flat panel displays, LCD projectors, or other types of display devices, etc.

The client 109 may be configured to execute various applications such as a client application 184 and/or other applications. The client application 184 is executed to obtain user interface data 187 from the computing device 103 and render various user interfaces to facilitate user action entry and submission of user action report data 190. The client application 184 may also render user interfaces for viewing and manipulating candidate workflows 136. In one embodiment, the client application 184 corresponds to a browser application that is configured, for example, to access and render network pages, such as web pages, or other network content served up by the computing device 103 and/or other servers. The client 109 may be configured to execute applications beyond the client application 184 such as, for example, browser applications, mobile applications, email applications, instant message applications, and/or other applications.

Next, a general description of the operation of the various components of the networked environment 100 is provided. To begin, users 127 access various user interfaces generated by the user action monitoring application 118. The user interfaces facilitate creation of workflow descriptions 133 and user action descriptions 124. The users 127 perform various user actions in connection with their respective occupational responsibilities and then transfer data to other users 127 so that other users 127 may perform their respective occupational responsibilities with respect to the workflow. Ultimately, the workflow is completed, and the overarching task associated with the workflow is completed.

User actions and workflows are monitored in this way over a period of time, thereby populating the user action descriptions 124, the workflow descriptions 133, the data dictionaries 142, etc. The workflow discovery application 121 is then executed to analyze the collected data to identify patterns in these observed workflows. For example, the workflows may have the same or similar workflow names 148. Also, the workflows may include a similar sequence of user action descriptions 124. Similarity of the user action descriptions 124 may be assessed according to a comparison of the action names 151, action data 154, priorities 157, time data 160, the source users 163, the destination users 166, and so on.

The similarity may also be assessed by determining types of source users 163, types of destination users 166, and relationships between the source users 163 and the destination users 166. The relationships may be determined according to managers 169, subordinates 172, teams 175, and/or other user relationship data 181. Moreover, the action data 154 may be classified according to the structure of business objects 130 and/or relationships between business objects 130.

After repeated patterns are identified, the workflow discovery application 121 generates candidate workflows 136 that represent generic workflows that correspond to the similar observed workflows. The candidate workflows 136 may be presented through a user interface for a manual review and manual modification. Statistical outliers may be highlighted and used to determine whether users 127 did not understand the task at hand or whether there are legitimate exceptions to the workflow. The potentially modified candidate workflows 136 may be used to generate workflow definitions 139 which are suitable for execution and further optimization in a workflow management system.

Figure 2A:
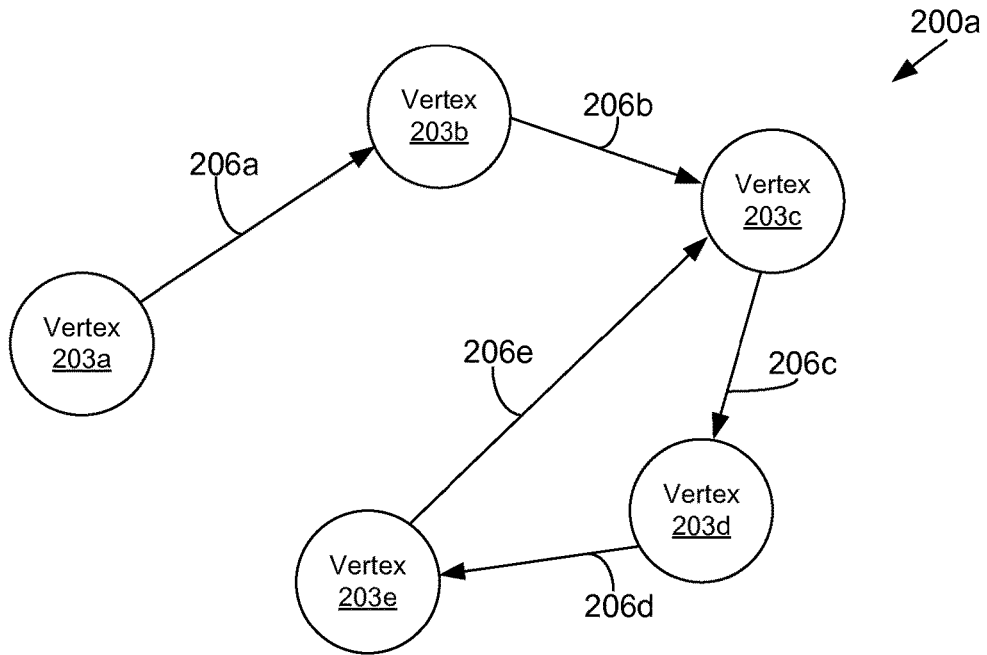
FIGS. 2A and 2B are drawings of examples of data models employed by a workflow discovery application executed in a computing device in the networked environment of FIG. 1 according to various embodiments of the present disclosure.
Figure 2B:
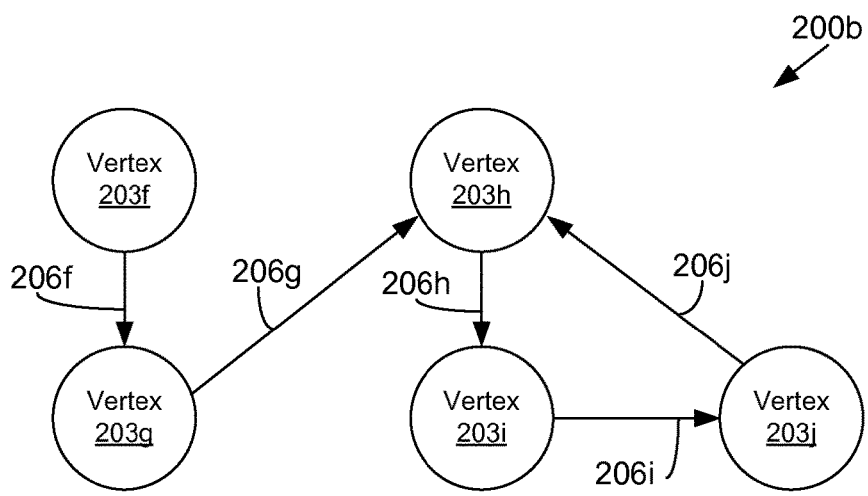

Referring next to FIGS. 2A and 2B, shown are drawings of examples of data models employed by the workflow discovery application 121 (FIG. 1) executed in a computing device 103 (FIG. 1) in the networked environment 100 (FIG. 1). In particular, FIG. 2A shows a directed graph 200a comprising a set of vertices 203a, 203b, 203c, 203d, and 203e and a set of arcs 206a, 206b, 206c, 206d, and 206e. The workflow descriptions 133 (FIG. 1) and the corresponding sequence of user action descriptions 124 (FIG. 1) may be modeled as the directed graph 200a in the following way. Each of the vertices 203 corresponds to a tuple including a user action of a user action description 124 (FIG. 1) and the destination user 166 (FIG. 1) who is assigned to perform the user action. Each arc 206 corresponds to a tuple including a source vertex 203 and a destination vertex 203. In some cases, the tuple of the arc 206 may include a condition under which the arc 206 is active or inactive.

FIG. 2B shows another directed graph 200b comprising a set of vertices 203f, 203g, 203h, 203i, and 203j and a set of arcs 206f, 206g, 206h, 206i, and 206j. Although directed graphs 200a and 200b have a different appearance, the directed graphs 200a and 200b may be identified as isomorphic because each vertex 203 of the directed graph 200a maps to a corresponding vertex 203 of the directed graph 200b, and each arc 206 of the directed graph 200a maps to a corresponding arc 206 of the directed graph 200b. In this example, vertex 203a maps to vertex 203f, vertex 203b maps to vertex 203g, vertex 203c maps to vertex 203h, vertex 203d maps to vertex 203i, and vertex 203e maps to vertex 203j. Further, arc 206a maps to arc 206f, arc 206b maps to arc 206g, arc 206c maps to arc 206h, arc 206d maps to arc 206i, and arc 206e maps to arc 206j.

In various embodiments, the workflow discovery application 121 may identify repeated patterns in the workflow descriptions 133 by modeling each workflow description 133 as a directed graph 200 and identifying directed graphs 200 that are isomorphic. The workflow discovery application 121 may also be configured to identify portions of directed graphs 200 which are isomorphic, thereby potentially identifying workflows that represent different conditions of the same workflow.

Additionally, context data may be available to aid determination of whether directed graphs 200 are isomorphic. For example, vertex 203 coloring schemes may be employed using attributes in the context data. A set of context data may be associated with each directed graph 200. In one embodiment, such context data may comprise multiple key-value pairs or other data structures. As a non-limiting example, the context data may be based at least in part on a respective action name 151 (FIG. 1) associated with each of the user actions, the action data 154 (FIG. 1) associated with the user actions, and a relationship between the source user 163 (FIG. 1) and the destination user 166 for each of the user actions.

In another embodiment, the vertices 203 may correspond to the user actions, while additional vertices 203 may be added which represent the users 127 (FIG. 1). The relationships between users 127 may be modeled with additional arcs 206.

Figure 3A:
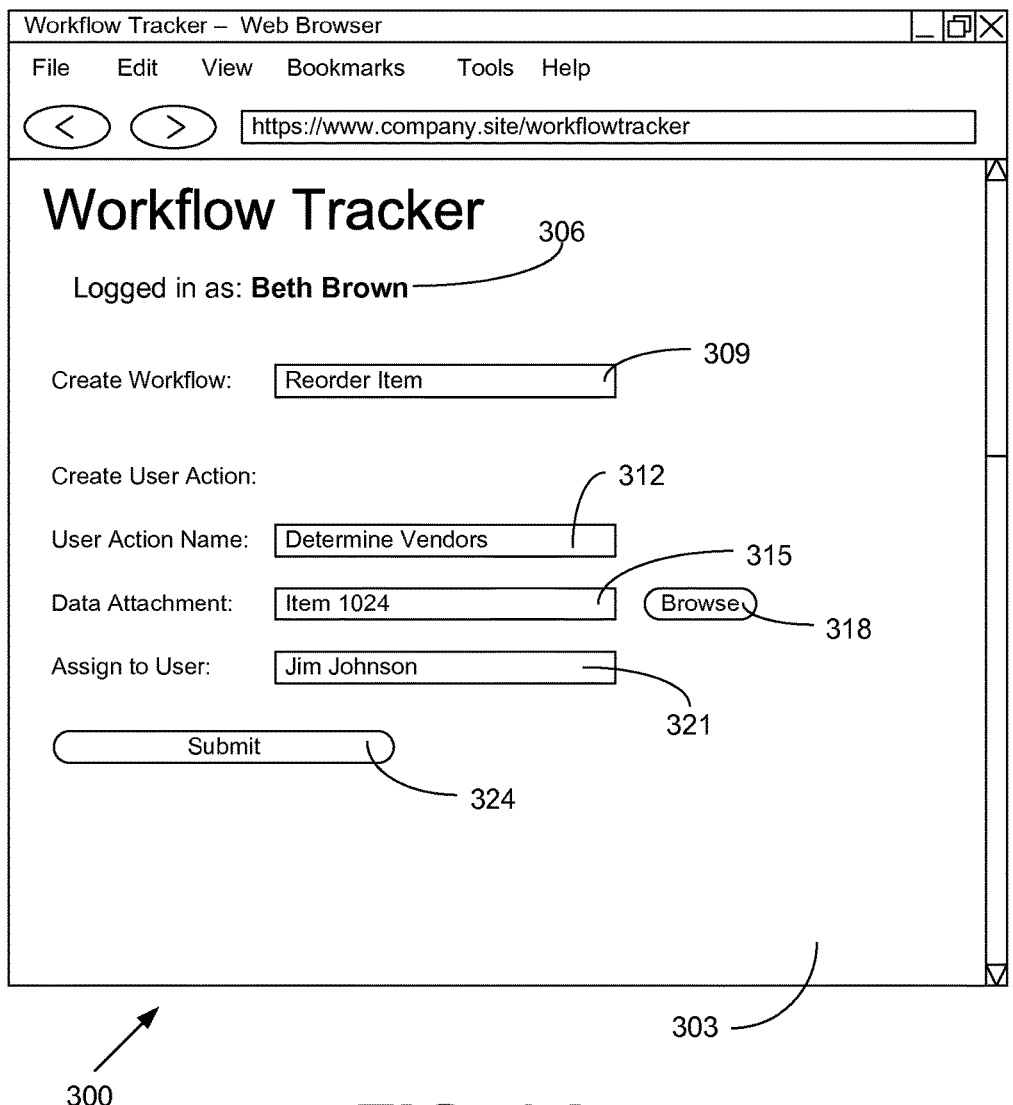
FIGS. 3A, 3B, and 4 are drawings of examples of user interfaces rendered by a client in the networked environment of FIG. 1 according to various embodiments of the present disclosure.

Turning now to FIG. 3A, shown is one example of a user interface 300 rendered by a client application 184 (FIG. 1) executed in a client 109 (FIG. 1) in the networked environment 100 (FIG. 1). In particular, the user interface 300 is configured to obtain input from a user 127 (FIG. 1) to create a workflow description 133 (FIG. 1) and a user action description 124 (FIG. 1). In the example of FIG. 3A, the user interface 300 comprises a rendered network page 303. The user interface 300 is rendered based at least in part on user interface data 187 (FIG. 1) obtained from the computing device 103 (FIG. 1) over the network 112 (FIG. 1).

The rendered network page 303 includes a user indication 306, which shows that the user 127 named "Beth Brown" is currently logged in. A create workflow component 309 allows the user 127 to specify a workflow name 148 (FIG. 1). In this example, the user 127 has specified "Reorder Item" to be the workflow name 148. It is noted that the create workflow component 309 may be configured to employ a data dictionary 142 (FIG. 1) of acceptable or previously used workflow names 148. To this end, the create workflow component 309 may comprise a drop-down box or auto-searching text field. The create workflow component 309 may also be configured to facilitate specification of a workflow name 148 which is not currently in the data dictionary 142.

The rendered network page 303 also includes a create user action component 312. The create user action component 312 allows the user 127 to specify an action name 151 (FIG. 1). In this example, the user 127 has specified "Determine Vendors" to be the action name 151. It is noted that the create user action component 312 may be configured to employ a data dictionary 142 of acceptable or previously used action names 141. To this end, the create user action component 312 may comprise a drop-down box or auto-searching text field. The create user action component 312 may also be configured to facilitate specification of an action name 151 which is not currently in the data dictionary 142.

A data attachment component 315 facilitates entry of free form data, uploading of files, specification of particular business objects 130 (FIG. 1), and/or other data pertaining to the user action, which will be stored as action data 154 (FIG. 1). A browse component 318 may be present to facilitate the location of files to be uploaded through the data attachment component 315. In this example, the user 127 has attached a business object 130 named "Item 1024."

A user assignment component 321 facilitates the assignment of the user action from the user 127 as a source user 163 (FIG. 1) to a destination user 166 (FIG. 1). In this example, the user assignment component 321 indicates that the user action is to be assigned to "Jim Johnson." The user assignment component 321 may be linked to a company directory or other source of user 127 information to ease and/or validate user 127 entry. For example, the destination user 166 may be identified in the user assignment component 321 by a unique identifier, a name, a position, a role, a team, etc. If the destination user 166 is not uniquely identified, the user action monitoring application 118 (FIG. 1) may be configured to assign the user action to a specific user 127 using criteria specified through the user assignment component 321.

It is noted that multiple user actions may be created through the user interface 300, and some user actions may be assigned to multiple destination users 166. A submit component 324 is provided to submit the user action report data 190 (FIG. 1) to the computing device 103. The components included in the user interface 300 may differ in other embodiments.

Figure 3B:
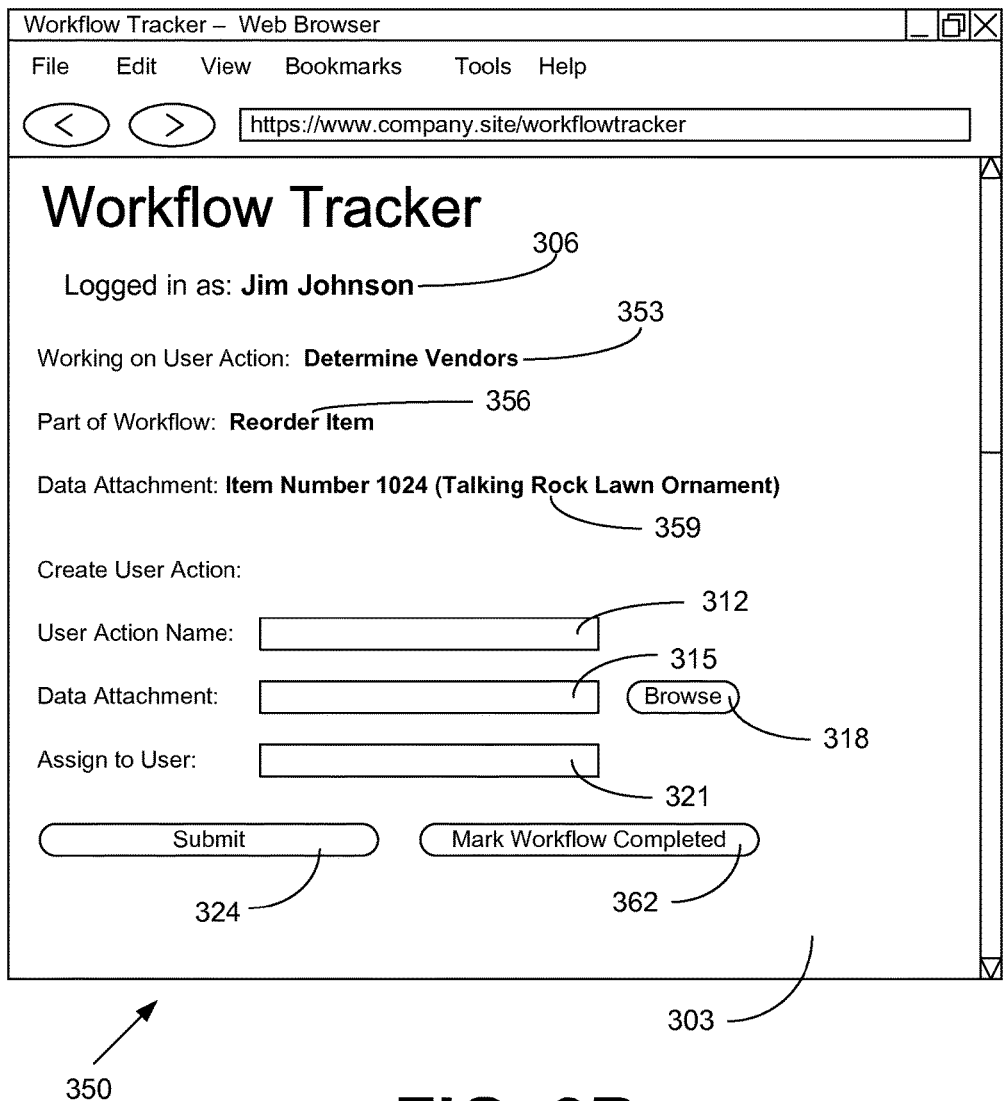

Moving on to FIG. 3B, shown is one example of a user interface 350 rendered by a client application 184 (FIG. 1) executed in a client 109 (FIG. 1) in the networked environment 100 (FIG. 1). In particular, the user interface 350 is configured to obtain input from a user 127 (FIG. 1) to create a user action description 124 (FIG. 1). In the example of FIG. 3B, the user interface 350 comprises a rendered network page 303. The user interface 350 is rendered based at least in part on user interface data 187 (FIG. 1) obtained from the computing device 103 (FIG. 1) over the network 112 (FIG. 1).

The rendered network page 303 includes a user indication 306, which shows that the user 127 named "Jim Johnson" is currently logged in. The rendered network page 303 includes a user action indication 353, a workflow indication 356, and an action data indication 359. The user action indication 353 indicates an action name 151 (FIG. 1) of "Determine Vendors" for the user action being worked on by the user 127.

The workflow indication 356 indicates a workflow name 148 (FIG. 1) of "Reorder Item" for the workflow with which the user action is associated. The action data indication 359 indicates action data 154 (FIG. 1) that has been specified for the current user action. In this example, the action data 154 refers to a business object 130 (FIG. 1) named "Item Number 1024" which has an associated title of "Talking Rock Lawn Ornament." Because the action data 154 refers to a business object 130, the user action monitoring application 118 (FIG. 1) is able to obtain associated data such as the title. In some cases, the user interface 350 may facilitate downloading of files and/or viewing of network pages relating to the action data 154.

The rendered network page 303 also includes a create user action component 312. The create user action component 312 allows the user 127 to specify an action name 151. It is noted that the create user action component 312 may be configured to employ a data dictionary 142 (FIG. 1) of acceptable or previously used action names 141 (FIG. 1). To this end, the create user action component 312 may comprise a drop-down box or auto-searching text field. The create user action component 312 may also be configured to facilitate specification of an action name 151 which is not currently in the data dictionary 142.

A data attachment component 315 facilitates entry of free form data, uploading of files, specification of particular business objects 130, and/or other data pertaining to the user action, which will be stored as action data 154. A browse component 318 may be present to facilitate the location of files to be uploaded through the data attachment component 315.

A user assignment component 321 facilitates the assignment of the user action from the user 127 as a source user 163 to a destination user 166 (FIG. 1). The user assignment component 321 may be linked to a company directory or other source of user 127 information to ease and/or validate user 127 entry. For example, the destination user 166 may be identified in the user assignment component 321 by a unique identifier, a name, a position, a role, a team, etc. If the destination user 166 is not uniquely identified, the user action monitoring application 118 may be configured to assign the user action to a specific user 127 using criteria specified through the user assignment component 321.

It is noted that multiple user actions may be created through the user interface 350, and some user actions may be assigned to multiple destination users 166. A submit component 324 is provided to submit the user action report data 190 (FIG. 1) to the computing device 103. A mark completed component 362 is provided for the user 127 to mark the current workflow as completed. The components included in the user interface 350 may differ in other embodiments.

Figure 4:
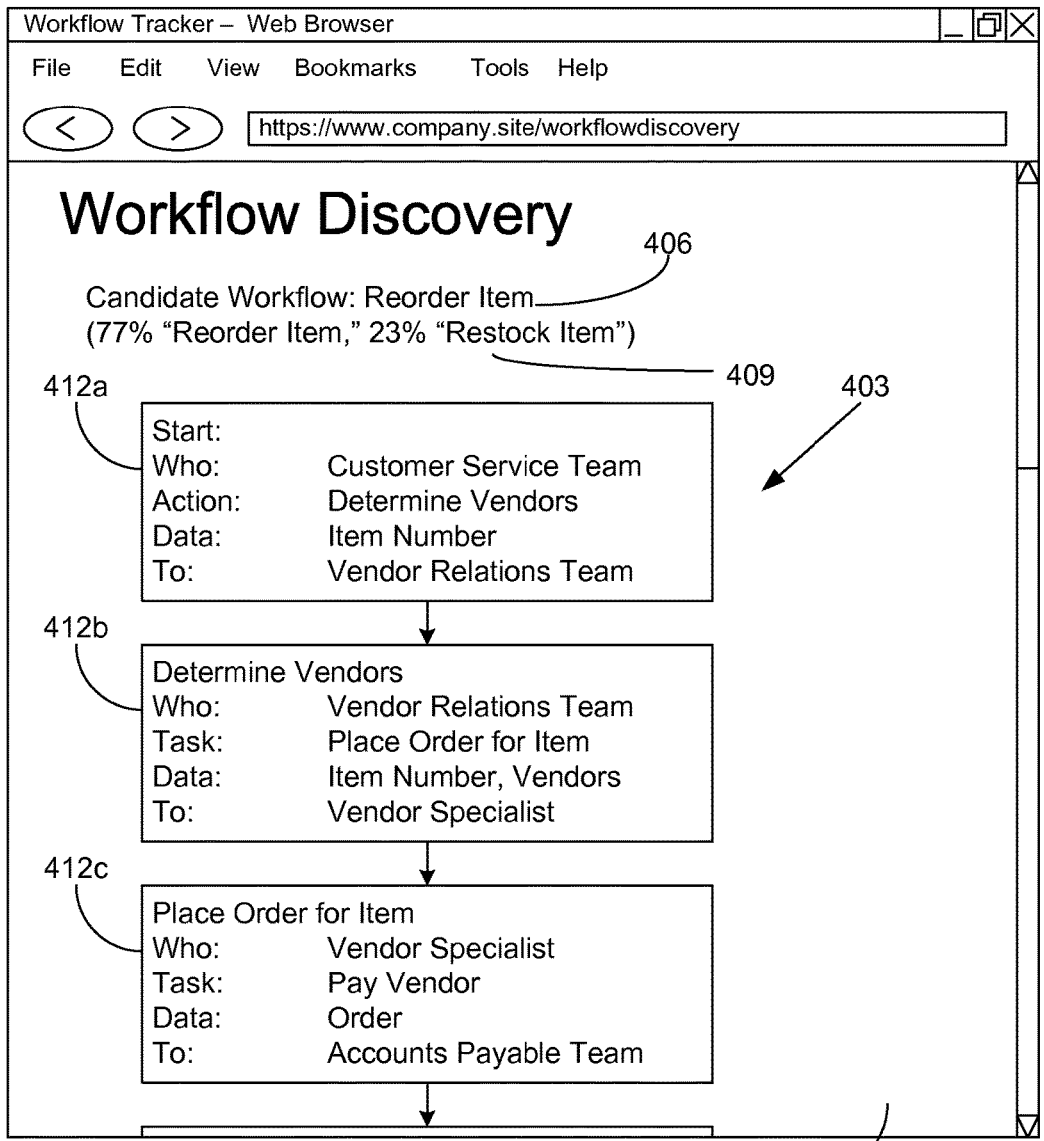

With reference to FIG. 4, shown is another user interface 400 rendered by a client application 184 (FIG. 1) executed in a client 109 (FIG. 1) in the networked environment 100 (FIG. 1). In particular, the user interface 400 is rendered based on user interface data 187 (FIG. 1) generated by the workflow discovery application 121 (FIG. 1). In this non-limiting example, the user interface 400 corresponds to a rendered network page 303.

The user interface 400 presents a representation 403 of a candidate workflow 136 (FIG. 1) identified by the workflow discovery application 121. The user interface 400 facilitates manual review of the candidate workflow 136. The example of FIG. 4 continues the examples of FIGS. 3A and 3B. A workflow name indication 406 indicates an identified workflow name 148 (FIG. 1) of "Reorder Item." However, other information 409 that is provided indicates that the candidate workflow 136 was identified according to a set of workflow descriptions 133 (FIG. 1) of which 77% had the workflow name 148 of "Reorder Item" and 23% had the workflow name 148 of "Restock Item." Various forms of other information 409 may be provided in conjunction with any pattern identified by the workflow discovery application 121. Other information 409 may facilitate verification of automatic determinations made by the workflow discovery application 121.

The representation 403 in this case is a graphical representation but could be a purely textual representation in other embodiments. Further, in other embodiments, simpler or more complex graphical representations may be employed. The representation 403 illustrates various states 412a, 412b, and 412c of the candidate workflow 136, each of the states 412 corresponding to user action descriptions 124 (FIG. 1).

The state 412a is the first user action of the candidate workflow 136. The state 412a indicates that the user action is created by some member of the "Customer Service Team," the action is named "Determine Vendors," the action includes an "Item Number," and the action is assigned to some member of the "Vendor Relations Team." To determine this state 412a, the workflow discovery application 121 may examine many such user action descriptions 124, such as the one created as the result of the example of the user interface 300 (FIG. 3A), wherein repeated patterns are identified.

The state 412b is the second user action of the candidate workflow 136. The state 412b indicates that the user action is created by some member of the "Vendor Relations Team," the action is named "Place Order for Item," the action includes an "Item Number" and listing of "Vendors," and the action is assigned to someone who fulfills the "Vendor Specialist" role. To determine this state 412b, the workflow discovery application 121 may examine many such user action descriptions 124, such as the one created as the result of the example of the user interface 350 (FIG. 3B), wherein repeated patterns are identified.

The state 412c is the third user action of the candidate workflow 136. The state 412c indicates that the user action is created by a "Vendor Specialist," the action is named "Pay Vendor," the action includes an "Order," and the action is assigned to someone who is in the "Accounts Payable Team." Additional states 412 may be included in the representation 403, though not shown in FIG. 4. In particular, the representation 403 may terminate with a completed state 412 indicating a final user action of the workflow.

Although not pictured in FIG. 4, the user interface 400 may also include tools for merging portions of multiple candidate workflows 136. For example, two candidate workflows 136 might actually be conditional branches of a single workflow. To this end, the workflow discovery application 121 may be configured to automatically propose a conditional candidate workflow 136 according to the similarities and differences between two or more candidate workflows 136. Also, the user interface 400 may include a tool for generating a workflow definition 139 (FIG. 1) from a candidate workflow 136.

Figure 5:
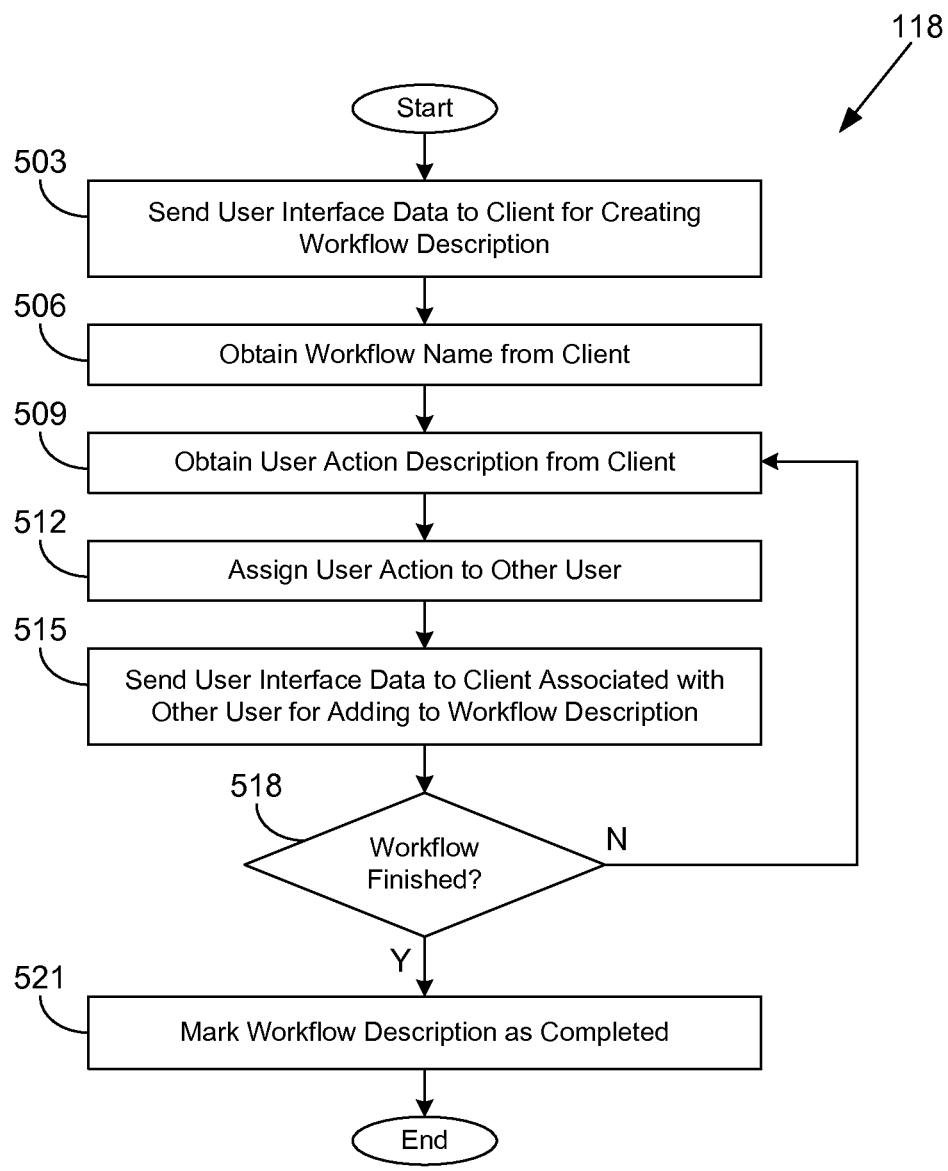
FIG. 5 is a flowchart illustrating one example of functionality implemented as portions of a user action monitoring application executed in a computing device in the networked environment of FIG. 1 according to various embodiments of the present disclosure.

Referring next to FIG. 5, shown is a flowchart that provides one example of the operation of a portion of the user action monitoring application 118 according to various embodiments. It is understood that the flowchart of FIG. 5 provides merely an example of the many different types of functional arrangements that may be employed to implement the operation of the portion of the user action monitoring application 118 as described herein. As an alternative, the flowchart of FIG. 5 may be viewed as depicting an example of steps of a method implemented in the computing device 103 (FIG. 1) according to one or more embodiments.

Beginning with box 503, the user action monitoring application 118 sends user interface data 187 (FIG. 1) to the client 109 (FIG. 1). The user interface data 187 encodes for rendering in the client 109 a user interface for creating a workflow description 133 (FIG. 1). The client 109 is associated with a user 127 (FIG. 1). In box 506, the user action monitoring application 118 obtains a workflow name 148 (FIG. 1) and potentially other data relating to the creation of a workflow description 133 from the client 109. In box 509, the user action monitoring application 118 obtains data relating to a user action description 124 (FIG. 1) from the client 109.

In box 512, the user action monitoring application 118 assigns the user action described by the user action description 124 to another user 127 as indicated by the destination user 166 (FIG. 1) field of the user action description 124. In box 515, the user action monitoring application 118 sends user interface data 187 to a client 109 associated with the other user 127. The user interface data 187 encodes for rendering in the client 109 a user interface for adding to the workflow description 133.

In box 518, the user action monitoring application 118 determines whether the other user 127 indicates that the workflow associated with the workflow description 133 is finished according to input supplied by the other user 127. If the workflow is not finished, the user action monitoring application 118 moves from box 518 to box 509 and obtains another user action description 124. It is noted that a user 127 may provide multiple user action descriptions 124 for a workflow. Also, in some cases, a user action may be assigned to multiple users 127. If the user action monitoring application 118 instead determines in box 518 that the workflow is finished, the user action monitoring application 118 moves to box 521 and marks the workflow description 133 as completed. Thereafter, the portion of the user action monitoring application 118 ends.

Figure 6:
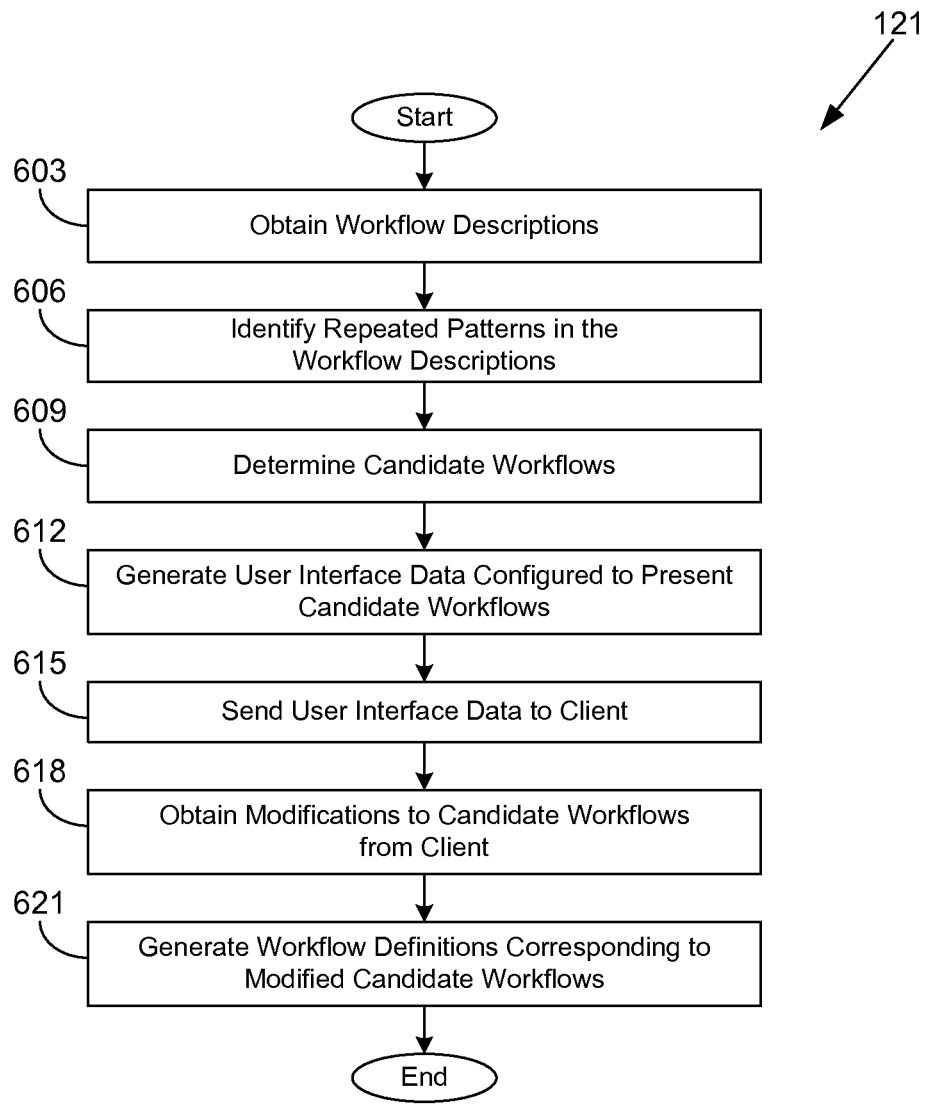
FIG. 6 is a flowchart illustrating one example of functionality implemented as portions of a workflow discovery application executed in a computing device in the networked environment of FIG. 1 according to various embodiments of the present disclosure.

Continuing now to FIG. 6, shown is a flowchart that provides one example of the operation of a portion of the workflow discovery application 121 according to various embodiments. It is understood that the flowchart of FIG. 6 provides merely an example of the many different types of functional arrangements that may be employed to implement the operation of the portion of the workflow discovery application 121 as described herein. As an alternative, the flowchart of FIG. 6 may be viewed as depicting an example of steps of a method implemented in the computing device 103 (FIG. 1) according to one or more embodiments.

Beginning with box 603, the workflow discovery application 121 obtains the workflow descriptions 133 (FIG. 1) as observed over a period of time by the user action monitoring application 118 (FIG. 1). In box 606, the workflow discovery application 121 identifies repeated patterns in the workflow descriptions 133. In box 609, the workflow discovery application 121 determines one or more candidate workflows 136 (FIG. 1) from the identified repeated patterns.

In box 612, the workflow discovery application 121 generates user interface data 187 (FIG. 1) that is configured to render a user interface that presents a representation of the candidate workflows 136. Such a representation may include a graphical representation and/or a textual representation. The representation may include explanations as to the identified repeated pattern(s) prompting the determination of a candidate workflow 136. The user interface may include functionality for modifying various aspects of the automatically determined candidate workflow 136. For example, the user interface may include functionality to merge multiple candidate workflows 136 if the reviewer determines that the candidate workflows 136 are conditional branches of one logical workflow. In box 615, the workflow discovery application 121 sends the user interface data 187 to the client 109.

In box 618, the workflow discovery application 121 obtains modifications to candidate workflows 136 from the client 109. In box 621, the workflow discovery application 121 generates workflow definitions 139 (FIG. 1) that correspond to the potentially modified candidate workflows 136. Thereafter, the portion of the workflow discovery application 121 ends.

Figure 7:
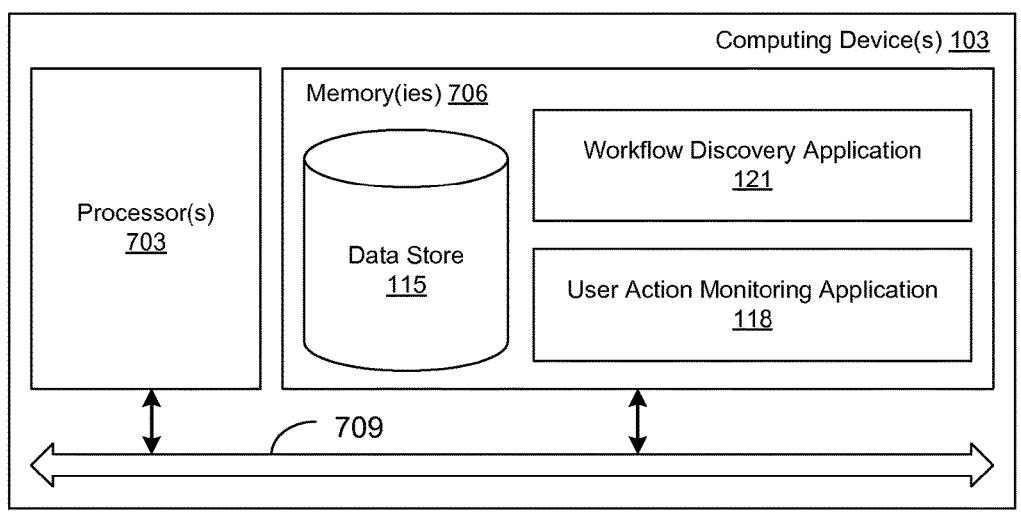
FIG. 7 is a schematic block diagram that provides one example illustration of a computing device employed in the networked environment of FIG. 1 according to various embodiments of the present disclosure.

With reference to FIG. 7, shown is a schematic block diagram of the computing device 103 according to an embodiment of the present disclosure. The computing device 103 includes at least one processor circuit, for example, having a processor 703 and a memory 706, both of which are coupled to a local interface 709. To this end, the computing device 103 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are the workflow discovery application 121, the user action monitoring application 118, and potentially other applications. Also stored in the memory 706 may be a data store 115 and other data. In addition, an operating system may be stored in the memory 706 and executable by the processor 703.

It is understood that there may be other applications that are stored in the memory 706 and are executable by the processor 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and the memory 706 may represent multiple memories 706 that operate in parallel processing circuits, respectively. In such a case, the local interface 709 may be an appropriate network 112 that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the workflow discovery application 121, the user action monitoring application 118, the client application 184 (FIG. 1), the relationship data provider 178 (FIG. 1), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 5 and 6 show the functionality and operation of an implementation of portions of the user action monitoring application 118 and the workflow discovery application 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowcharts of FIGS. 5 and 6 show a specific order of execution, it is understood that the order of execution may differ from that which is depicted. For example, the order of execution of two or more blocks may be scrambled relative to the order shown. Also, two or more blocks shown in succession in FIGS. 5 and 6 may be executed concurrently or with partial concurrence. Further, in some embodiments, one or more of the blocks shown in FIGS. 5 and 6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the workflow discovery application 121, the user action monitoring application 118, the client application 184, and the relationship data provider 178, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:

detecting, via at least one of one or more computing device, a plurality of user actions occurring with respect to a plurality of user interfaces rendered individually on a plurality of client devices, the plurality of user actions being performed for individual ones of a plurality of workflow descriptions, wherein at least one of the plurality of workflow descriptions are entered by a first user;

identifying, via at least one of the one or more computing devices, a repeated pattern in at least one of the plurality of workflow descriptions by modeling individual ones of the plurality of workflow descriptions as corresponding directed graphs including a set of vertices and a set of arcs, individual ones of the vertices corresponding to a particular user action and a second user assigned to perform the particular user action, individual ones of the arcs corresponding to a source vertex and a destination vertex, individual ones of the corresponding directed graphs including a corresponding set of context data based at least in part on a respective action name associated with the plurality of user actions, the corresponding set of context data being associated with the plurality of user actions, and a relationship between the first user and the second user for individual ones of the plurality of user actions;

determining, via at least one of the one or more computing devices, at least one candidate workflow base at least in part on identifying a set of isomorphic directed graphs from the corresponding directed graphs and the repeated pattern in the at least one of the plurality of workflow descriptions;

merging, via at least one of the one or more computing devices, a first candidate workflow and a second candidate workflow into the at least one candidate workflow, wherein the first candidate workflow and the second candidate workflow are merged to be conditional branches of the at least one candidate workflow; and generating, via at least one of the one or more computing devices, a respective user interface configured to render a representation of the at least one candidate workflow.

2. The method of claim 1, wherein the at least one candidate workflow is identified based at least in part on the corresponding set of context data associated with the set of isomorphic directed graphs.

3. The method of claim 1, further comprising receiving, via at least one of the one or more computing devices, data describing the relationship between the first user and the second user for the individual ones of the plurality of user actions from another computing device.

4. A non-transitory computer-readable medium embodying at least one program executable in a computing device, wherein the at least one program, when executed, causes the computing device to at least:
  encode a user interface for receiving a plurality of workflow descriptions, wherein at least one of the plurality of workflow descriptions are entered by a first user;
  detect a plurality of user actions occurring with respect to a plurality of client devices over a network for a period of time, wherein individual ones of the plurality of workflow descriptions are populated with at least some of the plurality of user actions;
  identify a repeated pattern in at least some of the plurality of workflow descriptions by modeling individual ones of the plurality of workflow descriptions as corresponding directed graphs; and
  determine at least one candidate workflow by identifying a set of isomorphic directed graphs based at least in part on the corresponding directed graphs and the repeated pattern in the at least some of the plurality of workflow descriptions, wherein individual ones of the corresponding directed graphs include a set of vertices and a set of arcs, individual ones of the vertices corresponding to a particular user action and a second user assigned to perform the particular user action, individual ones of the arcs corresponding to a source vertex and a destination vertex.

5. The non-transitory computer-readable medium of claim 4, wherein the at least one program further causes the computing device to generate the user interface configured to receive the individual ones of a plurality of user action descriptions.

6. The non-transitory computer-readable medium of claim 4, wherein the at least one program further causes the computing device to:
  generate one of the plurality of workflow descriptions based at least in part on a workflow name received from the first user; and
  add a particular user action description to a sequence of user action descriptions included in the one of the plurality of workflow descriptions based at least in part on an action name received from the first user.

7. The non-transitory computer-readable medium of claim 4, wherein individual ones of the corresponding directed graphs include a corresponding set of context data based at least in part on a respective action name associated with the plurality of user actions, data associated with the plurality of user actions, and a relationship between a respective first user and a respective second user for individual ones of the plurality of user actions.

8. The non-transitory computer-readable medium of claim 7, wherein the at least one candidate workflow is identified based at least in part on the corresponding set of context data associated with the set of isomorphic directed graphs.

9. The non-transitory computer-readable medium of claim 4, wherein the at least one program further causes the computing device to merge a first candidate workflow and a second candidate workflow into the at least one candidate workflow, wherein the first candidate workflow and the second candidate workflow are merged to be conditional branches of the at least one candidate workflow.

10. The non-transitory computer-readable medium of claim 9, wherein the at least one program further causes the computing device to generate the user interface that renders a graphical representation of the at least one candidate workflow.

11. A system, comprising:
  at least one computing device; and
  at least one application executable by the at least one computing device, wherein, when executed, the at least one application causes the at least one computing device to:
    generate a first user interface configured to receive a workflow description entered by a first user;
    detect a plurality of user actions occurring with respect to a plurality of client devices over a network for a period of time, wherein the workflow description is populated with at least one of the plurality of user actions;
    identify a repeated pattern in the workflow description by modeling the workflow description as a directed graph;
    determine at least one candidate workflow by identifying a set of isomorphic directed graphs based at least in part on the directed graph and the repeated pattern in the workflow description, wherein the set of isomorphic directed graphs are identified further based at least in part on at least one other directed graph corresponding to at least one other workflow description; and
    generate a second user interface configured to render a representation of the at least one candidate workflow.

12. The system of claim 11, wherein the at least one candidate workflow is determined based at least in part on relationship data indicating a relationship between the first user and a second user within an organization.

13. The system of claim 11, wherein the directed graph includes a set of vertices and a set of arcs, individual ones of the vertices corresponding to a particular user action and the second user assigned to perform the particular user action, individual ones of the arcs corresponding to a source vertex and a destination vertex.

14. The system of claim 11, wherein the at least one application further causes the at least one computing device to generate another user interface configured to render the representation of the at least one candidate workflow.

15. The system of claim 11, wherein the at least one application further causes the at least one computing device to generate another user interface configured to render the representation of the at least one candidate workflow.

16. The system of claim 15, wherein the other user interface includes one or more tools configured to map at least a portion of a first candidate workflow to be a conditional branch of a second candidate workflow.

17. The system of claim 15, wherein the other user interface includes one or more tools configured to edit the at least one candidate workflow.

18. The system of claim 15, wherein the other user interface includes one or more tools configured to generate a workflow definition for the at least one candidate workflow in a workflow definition language.

19. The system of claim 11, wherein the at least one application further causes the at least one computing device to merge a first candidate workflow and a second candidate workflow into the at least one candidate workflow, wherein the first candidate workflow and the second candidate workflow are merged to be conditional branches of the at least one candidate workflow.

20. The system of claim 11, wherein the workflow description describes a sequence of at least some of the plurality of user actions occurring on at least one of the plurality of client devices.

* * * * *